2,885,977

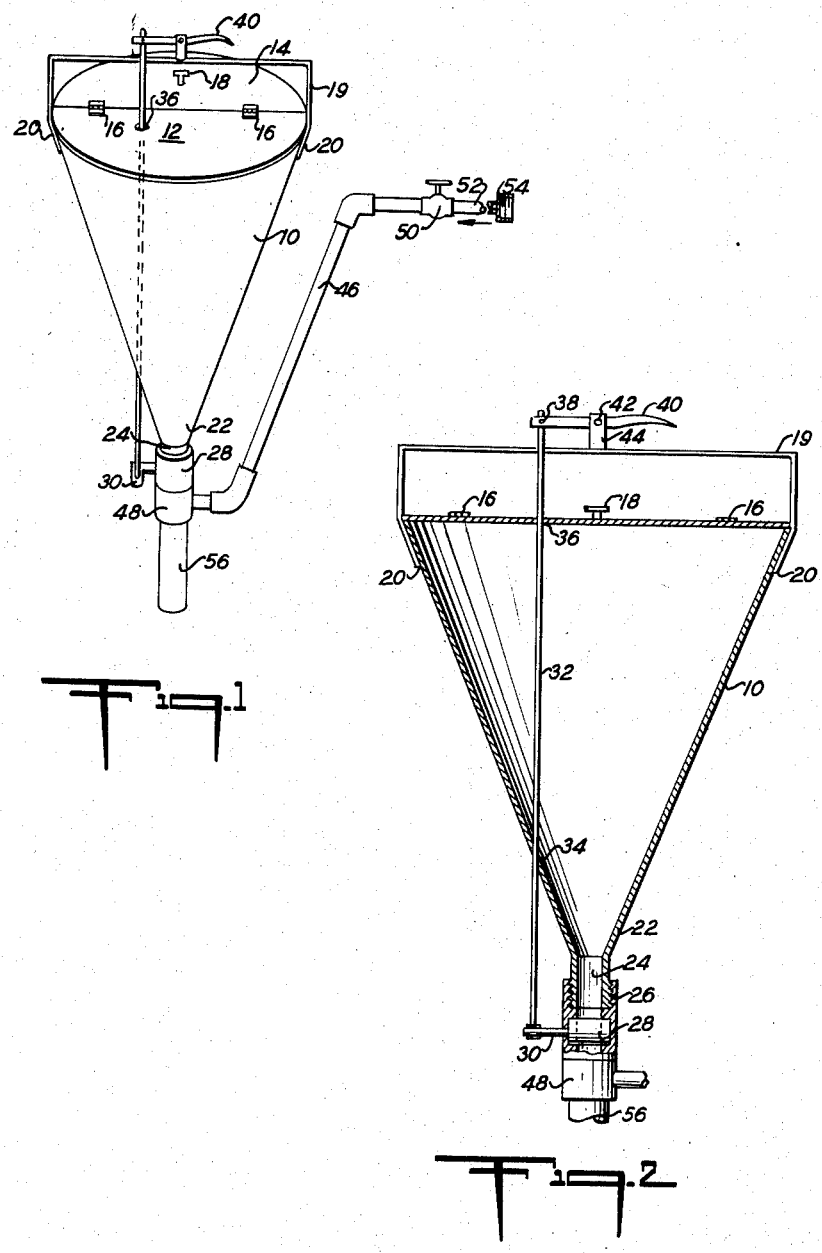

SUB-SOIL FERTILIZER APPLICATOR

Juraj Fabus, Copiague, N.Y.

Application July 9, 1956, Serial No. 596,639

1 Claim. (Cl. 111—7.1)

This invention relates to a device for irrigating and fertilizing plant roots beneath the surface of the soil.

The invention is particularly directed to a device which is better able to introduce sheep manure and like fertilizers around the root structure of plants.

Many workers in the prior art have developed devices for irrigating plant roots and at the same time fertilizing the roots. These mechanisms require, as a fertilizer, either a liquid solution or a finely granulated type fertilizer which can be entrained by irrigating water and forced into the soil. No satisfactory arrangement has yet been provided for introducing manure type fertilizers beneath the soil.

The applicant's invention is designed to provide a solution to this problem and consists broadly in an arrangement for forcing a rather large tube into the ground and providing means for introducing manure through the large tube into the ground without requiring the use of an entraining liquid for the purpose of bringing the fertilizer into the ground.

It is therefore an object of the invention to provide an irrigator fertilizer device for introducing manure beneath the surface of the soil adjacent plant roots.

It is another object of the invention to provide a mechanism consisting principally of a hopper feeding into a large tube and having means for supplying water to the tube for irrigation purposes and to assist in forcing the tube into the soil.

It is still another object of the invention to provide such a mechanism as described above, having a first valve for controlling the feed of manure into said tube and a second valve for controlling the flow of irrigating water, said irrigating water being introduced into said tube below said first mentioned valve.

These and other objects of the invention will become more readily apparent from the following detailed description of the invention, taken in conjunction with the accompanying drawing in which:

Fig. 1 is a perspective view of the invention, and

Fig. 2 is a cross-sectional view of the invention.

The invention consists of a hopper 10, having ½ of the upper end covered by a semi-circular plate 12 fixed to the hopper and a semi-circular cover 14 pivoted at hinges 16 to plate 12. A handle 18 is provided on cover 14 to permit the cover to be opened for introducing manure into the hopper 10. A handle 19 is rigidly secured at 20 to the hopper so that the device may be conveniently carried about and firmly held during the irrigating operation.

The lower and smaller end 22 of the hopper terminates in a tube 24 of approximately two inches inside diameter and having external threads 26 for connection with a two inch valve 28. The valve 28 has an operating arm 30 operably controlled by a rod 32 passing through a hole 34 in the hopper 10 and a hole 36 in the plate 12.

The upper end of rod 32 is pivotally connected at 38 to the end of a lever 40. The lever 40 is pivoted at 42 to a fulcrum member 44 fixed to the handle 19.

A one inch pipe 46 is connected immediately below the valve 28 by a T connection 48. A valve 50 controls the flow of water through the pipe 46. A pipe 52 connected to the inlet side of valve 50 is provided with a threaded hose coupling 54 and is thereby adapted to be connected to a supply of irrigating water.

A 1½ inch inside diameter pipe or tube 56 is connected to the T connection 48 and is approximately 18 inches long.

In operation, a garden hose is connected by the coupling 54 to the pipe 52 and valve 50 is closed. The hopper 10 is loaded with sheep manure and the lower end of pipe 56 is placed adjacent the plant whose roots are to be fertilized. While the device is held firmly in an upright position, a valve 50 is opened to permit water under pressure to pass through pipe 46 and down tube 56. During this operation, valve 28 is closed so that the back pressure will not force water into hopper 10. The weight of the operator holding the device against the ground combined with the action of the water under pressure causes a hole to be forced into the ground. When the hole has reached the desired depth, the valve 50 is closed and valve 28 is opened by squeezing lever 40 against handle 19. The manure contained in hopper 10 will pass from the hopper through tube 56 and into the ground. The operator may shake the hopper slightly to encourage the passing of the manure through the pipe 56.

Because sheep manure or like manure is not as free flowing as a liquid or a finely granulated fertilizer, it is important that the pipe 56 be large enough to pass the manure. An inside diameter of at least 1½ inches is preferred. On the other hand, the pipe should not be too large or it will be difficult to force the hole into the ground.

In a general manner, while there has been disclosed in the above description, what is deemed to be the most practical and efficient embodiment of the invention, it should be well understood that the invention is not limited to such embodiment as there might be changes made in the arrangement, disposition and form of the parts without departing from the principle of the present invention as comprehended within the scope of the accompanying claim.

I claim:

A device for fertilizing roots beneath the surface of the soil, comprising in combination, an inverted cone-shaped hopper for receiving dry manure which coheres when wet, said hopper having an outlet at the lower end thereof, a dispensing pipe having a uniform internal diameter throughout its length substanaitlly the same as said outlet, and having its upper end attached to the hopper at said outlet and extending from said point of attachment to an open ground-engaging end, a valve rotatable on a horizontal axis in said dispensing pipe for controlling the flow of manure from said hopper to said dispensing pipe, a stem connected to said valve and extending outside said pipe, valve control means to operate said valve comprising a handle fixed to the top of said hopper, a control lever pivotally mounted on said handle, and a rod extending from said lever through the side wall of said hopper and connected to said stem, means for supplying water under pressure to said dispensing pipe, including a manually controlled regulating member, said means for supplying water being connected to said dispensing pipe at a point below said valve and substantially above said ground-engaging end, whereby when said valve is closed, and said regulating member open to permit the supply means to supply water to said dispensing pipe, then said pipe may be used to form a hole, and after the hole is so formed, said regulating member may be turned to stop the supply of said water and said valve may be opened to supply dry fertilizer to said hole.

References Cited in the file of this patent

UNITED STATES PATENTS

| | | |
|---|---|---|
| 797,531 | Peters | Aug. 15, 1905 |
| 1,650,081 | Lindsay | Nov. 22, 1927 |
| 1,743,983 | Seltzer | Jan. 14, 1930 |
| 2,083,153 | Irish | June 8, 1937 |
| 2,242,789 | McFee | May 20, 1941 |
| 2,800,865 | Gathercoal | July 30, 1957 |